(12) United States Patent
Mazuir et al.

(10) Patent No.: US 8,637,829 B2
(45) Date of Patent: Jan. 28, 2014

(54) MULTIFUNCTIONAL IMAGE ACQUISITION DEVICE

(75) Inventors: Alain Mazuir, Saint Maximin la Sainte Baume (FR); Laurent Guilhaumon, La Seyne sur Mer (FR)

(73) Assignee: Sopro, La Ciotat Cedex (FR)

( * ) Notice: Subject to any disclaimer, the term of this patent is extended or adjusted under 35 U.S.C. 154(b) by 0 days.

(21) Appl. No.: 13/129,461

(22) PCT Filed: Oct. 28, 2009

(86) PCT No.: PCT/FR2009/052080
§ 371 (c)(1),
(2), (4) Date: May 16, 2011

(87) PCT Pub. No.: WO2010/061086
PCT Pub. Date: Jun. 3, 2010

(65) Prior Publication Data
US 2011/0233416 A1    Sep. 29, 2011

(30) Foreign Application Priority Data
Nov. 25, 2008 (FR) ...................................... 08 58011

(51) Int. Cl.
*H01L 27/146* (2006.01)
*G01T 1/20* (2006.01)

(52) U.S. Cl.
USPC ................................ 250/370.09; 250/370.11

(58) Field of Classification Search
USPC ........................ 250/370.09, 370.11
See application file for complete search history.

(56) References Cited

U.S. PATENT DOCUMENTS

| 5,331,166 | A  | * | 7/1994  | Crosetto et al. ........... 250/370.11 |
| 5,510,623 | A  |   | 4/1996  | Sayag et al. |
| 6,002,742 | A  |   | 12/1999 | Nelvig |
| 6,404,854 | B1 | * | 6/2002  | Carroll et al. ................. 378/98.8 |
| 7,006,600 | B1 |   | 2/2006  | Krema et al. |
| 7,075,090 | B2 | * | 7/2006  | Endo ......................... 250/370.11 |
| 7,566,876 | B2 | * | 7/2009  | Moody et al. ............. 250/370.08 |

FOREIGN PATENT DOCUMENTS

| DE | 42 35 527  | 4/1993 |
| EP | 0 429 977  | 6/1991 |
| EP | 0 817 472  | 1/1998 |
| EP | 1 537 826  | 6/2005 |
| WO | 03/032839  | 4/2003 |

\* cited by examiner

*Primary Examiner* — David Porta
*Assistant Examiner* — Kenneth J Malkowski
(74) *Attorney, Agent, or Firm* — Clark & Brody

(57) ABSTRACT

The invention relates to an image acquisition device enabling a dental radiological image to be obtained, the device comprising a matrix sensor (C) having integrated therein a plurality of image acquisition photodiodes (DA) sensitive to irradiation and at least one detection photodiode (DD) also sensitive to irradiation, the device also comprising a control module (M) for controlling the sensor (C) and suitable for periodically reading the detection photodiode (DD) and for causing the sensor (C) to change over (SBA) between at least two modes: a standby mode and an acquisition mode (ACQ). According to the invention, the detection photodiode (DD) is suitable for delivering a periodic output signal (NDD) to the control module (M), including during irradiation and image acquisition (ACQ) by the acquisition photodiodes (DA), which periodic output signal (NDD) has a value that is representative of the instantaneous received energy, and the control module (M) makes use of this periodic output signal (NDD) to analyze the energy received during acquisition (ACQ).

15 Claims, 4 Drawing Sheets

MULTIFUNCTIONAL IMAGE ACQUISITION DEVICE

BACKGROUND OF THE INVENTION

The present invention relates to the general field of image acquisition sensors and controlling such sensors.

More precisely, the invention relates to an image acquisition device enabling a dental radiological image to be obtained, the device comprising a matrix sensor and a control module for the sensor. The invention relates to devices in which the matrix sensor comprises a plurality of image acquisition photodiodes that are sensitive to radiation, together with at least one detection photodiode that is likewise sensitive to radiation.

Such sensors exist, in particular made using complementary metal oxide-on-silicon (CMOS) technology, that make it easy to integrate photodiodes having different geometrical characteristics on a common substrate. It is useful for the detection photodiode(s) to present, for example, a size that is different from the size of the acquisition photodiodes so as to obtain higher sensitivity, enabling radiation to be detected more quickly.

The device of the invention further comprises a control module for controlling the matrix sensor, and arranged to read the detection photodiode periodically and to cause the sensor to change over between at least two modes: a standby mode in which the acquisition photodiodes are inhibited; and an acquisition mode in which the energy received by the acquisition photodiodes is used for acquiring an image.

The term "inhibit" is used to mean that any photons received are not loaded, either by periodically purging the acquisition photodiodes, or by blocking photon reception by the acquisition photodiodes.

In known devices, the changeover is triggered as soon as the detection photodiode detects irradiation by a generator. Generally, receiving a predetermined quantity of light means that irradiation has been detected.

Existing devices thus enable image acquisition to be triggered as soon as the photodiode has received a given quantity of energy in the period between two reads of the detection photodiode.

With known devices, image acquisition is generally performed throughout the duration of irradiation or for a predetermined duration independently of the quantity of energy that is actually sent towards the sensor.

OBJECT AND SUMMARY OF THE INVENTION

A main object of the present invention is thus to add to the functions of image acquisition devices for obtaining a dental radiological image as specified in the introduction by proposing that such a device should be such that the detection photodiode is arranged to deliver a periodic output signal to the control module, including during irradiation and image acquisition by the acquisition photodiodes, which periodic output signal has a value that is representative of the instantaneous received energy, and the control module uses this periodic output signal to analyze the energy received during acquisition.

Such an integrated matrix sensor enables the energy received by the sensor to be tracked during image acquisition since the diode is suitable for acting, including during acquisition, to provide a signal that is representative of the received energy and that is thus quantitative. This signal is referred to below by terms "quantitative signal".

With such an image acquisition device, the control module is aware of the quantity of energy received by the sensor, including during the period of irradiation. The characteristic whereby the detection photodiode is suitable for delivering a periodic signal, where the period of the periodic signal is defined by the period with which the detection photodiode is read, makes it possible to implement all sorts of irradiation control that were not previously possible using known devices.

In particular, the invention makes it possible to perform quantitative analysis of the instantaneous received energy on a permanent basis. By tracking this instantaneous received energy, it is possible to detect malfunctions of the generator. The invention thus makes it possible to know the quality of the generator without having recourse to dedicated appliances suitable for measuring the quantity of energy that is actually emitted.

Thus, according to an advantageous characteristic, the control module is suitable for inserting a curve tracking the quantity of received energy in a dedicated zone of the acquired image.

On analyzing any image acquired with a sensor of the invention while being irradiated by a particular generator, this characteristic makes it possible to extract from said image the curve tracking the received energy. This makes it possible to evaluate the quality of the emission by the generator in question since its emission curve is made available.

The dedicated zone where the oscillogram curve of the received energy is inserted is preferably a masked zone in the image. It is either taken on the image itself, e.g. constituting the first or the last line of the image, or else it constitutes an additional "zero" line added to the image.

With this advantageous characteristic, the invention blocks off a very small portion of the image so as to insert therein and store data relating to the characteristics of the generator, since it relates to the energy as received, and thus as emitted. Thus, when an image of poor quality is obtained, it is always possible with the invention to determine whether the poor quality is due to poor emission by the generator or whether some other reason needs to be found, for example the sensor moved during acquisition.

It is recalled that the standby mode in which the acquisition photodiodes are inhibited means that the photons are not loaded by periodically purging them or by blocking photon reception. Thus, in standby mode, purging or blocking continues until the detection photodiode detects radiation. This makes it possible to obtain a good signal-to-noise ratio in the final image. Otherwise, parasitic light received during the standby period generates a background noise phenomenon on the image, thereby degrading its quality.

It is in any event necessary and known that the detection photodiode needs to be larger than the acquisition photodiodes in order for it to be sufficiently sensitive to detect radiation very quickly while in standby mode. Under such circumstances, it is very easily saturated. However, according to the functional characteristic of the invention, the photodiode is required to continue delivering a signal that is quantitative, including during acquisition.

Thus, advantageously, the control module is arranged to modify the resolution of the detection photodiode as a function of the output signal from the detection photodiode so as to ensure that the detection photodiode does not saturate during irradiation.

Such a modification to its resolution is useful when the sensitivity required for detecting radiation does not make it possible to ensure there will be no saturation during irradiation.

This characteristic enables the detection diode to present a size that is large enough to be sufficiently sensitive during standby mode and for it nevertheless to be capable of delivering a quantitative signal representative of the quantity of energy received throughout irradiation, since this is the original and novel function of the invention.

According to the invention, this characteristic can be implemented in two particular manners by acting on two distinct saturation phenomena.

The first phenomenon is the saturation phenomenon whereby the photodiode itself saturates physically between two reads on receiving a quantity of energy greater than its "saturation" quantity of energy. If the quantity of energy received between two reads is greater than the saturation quantity of energy, then the signal read from the photodiode can no longer be quantitative.

Typically, the photodiode read signal is subsequently amplified by an electronic processor stage prior generally to being sampled to produce the photodiode output signal.

The term "photodiode read signal" is used herein to mean the signal as read from the photodiode, while the term "photodiode output signal" is used to mean the signal as obtained after amplification.

The second phenomenon is the saturation phenomenon that results from amplification of the detection diode read signal. Amplification cannot produce a photodiode output signal greater than its power supply voltage. If amplifying a non-saturated photodiode read signal, i.e. a signal that is quantitative, leads to an output signal that is higher than the power supply voltage, then it is the output signal that cannot be quantitative.

According to a particular characteristic of the invention, in order to modify resolution, the control module is arranged to increase the frequency at which the detection photodiode is read after radiation has been detected.

Under such circumstances, the capacity for processing the energy received from the photodiode is increased. By increasing the read frequency, the detection photodiode can absorb more energy in a given lapse of time and it may be observed that there is no saturation phenomenon.

In the known prior art, the detection element does not quantify the energy flux it receives, so it does not matter that the detection element saturates during irradiation. Indeed that is what is observed in practice in the prior art. However that is contrary to the subject matter of the invention, which enables the quantity of energy that is received to be known by the control module on a permanent basis and in quantitative manner.

Increasing the frequency thus amounts to reducing the resolution of the photodiode, since for given received power, the detection photodiode will be read for smaller amounts of charge on the detection photodiode. Nevertheless, this does not harm the accuracy of reading during irradiation since large quantities of energy are then received and by increasing the frequency it becomes possible specifically for the quantities that are read to be representative of the quantities of energy that are actually received.

Increasing the read frequency may correspond to multiplying it by ten, for example. Such an increase in the read frequency makes it possible to ensure that the photodiode saturates only when the energy received in a given time lapse is ten times greater than when using the initial frequency.

According to another particular characteristic of the invention, each signal read from the detection photodiode is amplified within a processor unit by an electronic gain to form the output signal from the sensor, and the control module is suitable for modifying the electronic gain.

This characteristic makes it possible to ensure that the output signal remains quantitative, providing the photodiode is not itself saturated.

Typically, the gain used during standby mode is very high in order to be able to detect radiation as quickly as possible. If the gain is maintained at this value during irradiation, then the output signal from the photodiode, i.e. the amplified read signal, will very likely exceed the power supply voltage of the amplifier stage and thus cease to be quantitative, even in the presence of an increase in the frequency with which the detection photodiode is read.

This characteristic makes it possible to resolve conflicts between fineness of detection during standby mode and the need to remain quantitative during acquisition mode.

Advantageously, gain modification takes place as soon as radiation is detected. When provision is made for the modification in read frequency to be independent of the level of energy received at the beginning of irradiation, it is advantageous for gain modification to occur before modification of the read frequency. Gain modification is thus advantageously used as well as and in combination with modification of the frequency at which the photodiode is read.

The use of a detection photodiode integrated on the same physical structure as the image acquisition photodiodes, makes it easier to control the read frequency or to modify the gain.

Advantageously, four levels of electronic gain are provided in the invention. This characteristic offers four levels of resolution for the quantity of energy read by the photodiode and makes it possible to obtain a quantitative output signal over a very wide range of energy levels that are read. The extreme gain levels may be dedicated at the highest end to resolving read quantities of energy lying in the range 0 to 10 millivolts (mV), and at the other extreme, at the small end, to resolving read quantities of energy lying in the range 0 to 1000 mV.

According to another characteristic, the detection photodiode output signal is quantified in continuous manner between two analog values.

This characteristic corresponds to sampling the output signal so that it is known in the form of a digital value enabling the received energy to be known with fine resolution. Such sampling is advantageously implemented on 8 bits.

In an advantageous embodiment, the detection photodiode is integrated at the periphery of the matrix sensor.

This characteristic makes it possible to integrate a rectangular photodiode of large size around the periphery of the acquisition photodiodes that are themselves integrated in the form of a matrix. CMOS technology makes such integration possible.

In a particular application, the control module is suitable for stopping acquisition mode as soon as a drop is observed in the detection photodiode output signal.

This characteristic makes it possible to control image acquisition as a function of the received energy. This makes it possible to obtain images of good quality, by ensuring that sufficient and optimum energy is received while ensuring there is no saturation effect that is penalizing for the acquisition photodiodes. When using an alternating current (AC) generator, the term "drop" in the output signal is used to mean that there is no output signal for a duration that is longer than one period of the generator. In particular, according to an advantageous characteristic, analyzing the quantity of energy received makes it possible, during acquisition, to calculate the quantity of energy received by the sensor so as to compare it with an optimum quantity of energy to be received by the sensor.

This characteristic makes it possible to know when the energy received by the sensor corresponds to the optimum amount of energy for obtaining an image of good quality. This can make it possible to stop acquisition mode once said optimum amount of energy has been reached and/or a command may be sent to the generator to cause it to stop.

Thus, according to an advantageous characteristic of the invention, the control module is arranged to send a command to an irradiation generator to cause it to stop irradiating as soon as the analysis of the received energy shows that the optimum quantity of energy has been received.

This advantageous characteristic makes it possible to optimize the quantity of radiation received by the patient since the generator itself is stopped as soon as the quantity of energy received by the sensor is appropriate for obtaining an image of quality.

Also advantageously, the control module is arranged to stop acquisition mode as soon as the analysis of the received energy shows that the optimum quantity of energy has been received.

The invention also provides a method of controlling an image acquisition device of the invention, the method comprising periodic steps of sending commands for reading the detection photodiode before and during irradiation and image acquisition by the acquisition photodiodes and providing a periodic output signal of value that is representative of the instantaneous received energy, a step of receiving said output signal, a step of commanding the sensor to change over between standby mode and acquisition mode, which step is triggered when the detection photodiode detects radiation from a generator, and an analysis step of analyzing the energy received during acquisition by using the periodic output signal.

This method serves to track the energy received by the matrix sensor before irradiation and throughout irradiation.

In a preferred implementation, the various steps of the method are determined by computer program instructions.

Consequently, the invention also provides a computer program on a data medium, the program being suitable for being implemented in a control module and including instructions adapted to implementing the steps of the method of the invention. The program may use any programming language and may be in the form of source code, object code, or code intermediate between source code and object code, such as in a form that is partially complied, or in any other desirable form.

The invention also provides a data medium readable by a control module and including instructions of a computer program as mentioned above. The data medium may be any entity or device capable of storing the program. The medium may be a hardware element or a transmissible medium, and in particular it may be downloaded from a network of the Internet type. Alternatively, the data medium may be an integrated circuit having the program incorporated therein.

BRIEF DESCRIPTION OF THE DRAWINGS

Other characteristics and advantages of the present invention appear from the following description made with reference to the accompanying figures that show an embodiment having no limiting character, in which figures.

DETAILED DESCRIPTION OF AN EMBODIMENT

Figure 1:
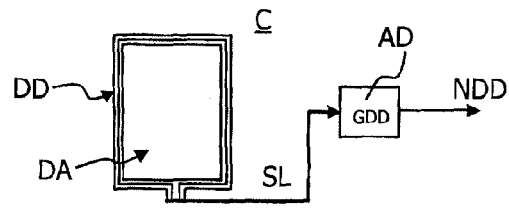
FIG. 1 is a diagram of a sensor as used in an image acquisition device of the invention.

FIG. 1 shows a sensor C of the invention in diagrammatic manner. This matrix sensor C is in the form of a central rectangular matrix having so-called "acquisition" photodiodes DA integrated therein.

At the periphery of the acquisition photodiodes DA, there is preferably integrated a single detection photodiode referenced DD.

In another embodiment that is less favorable, it is possible to envisage integrating a plurality of detection photodiodes implemented in such a manner as to be read periodically in the manner of the invention. Nevertheless, it is desirable for the size of the detection photodiode DD to be much greater than the size of the acquisition photodiodes DA constituting the center of the matrix sensor. This ensures that the detection photodiode saturates more quickly and that it therefore has sensitivity that is appropriate for detecting the radiation. For given working area, it is therefore preferable to integrate a single detection diode. Advantageously, such a single detection photodiode DD is integrated at the periphery of the acquisition photodiodes DA.

Naturally, in a variant, the detection and/or acquisition photodiodes may be replaced by any type of photosensitive element, such as phototransistors, for example.

The matrix sensor C is thus integrated in such a manner as to be capable of including both types of diode, e.g. using CMOS technology. It is sensitive to radiological irradiation through a scintillator that transforms the quantity of energy received in the form of X-rays into a quantity of light.

The energy received on the detection photodiode DD is then read periodically at the read frequency. The analog data read from the photodiode constitutes a photodiode read signal SL. Periodic read signals SL are thus obtained during successive readings of the detection photodiode. They are representative of the received energy.

As shown diagrammatically in FIG. 1, the sensor C is associated with an electronic processor unit AD suitable for transferring the analog data SL read from the sensor into digital data constituting, at the output from the processor unit AD, an output signal from the detection photodiode, referenced NDD. This output signal NDD is likewise periodic.

The analog-to-digital processor unit AD applies electronic gain, written GAD, while transferring the analog data as read from the detection photodiode DD into a digital quantity. The unit AD thus amplifies the read signal using the gain GAD and then samples the resulting amplified analog value.

Advantageously, the sampling is such as to obtain a value for the output signal NDD that is practically analog between two extreme values, said output signal being representative of the energy received on the sensor.

The unit AD is advantageously an integrated portion of the matrix sensor C, as shown diagrammatically in FIG. 1. It could also be separate therefrom on a controller component advantageously then also including the control module M. Furthermore, it should also be observed that the control module M may also be integrated on the same integrated circuit as the sensor C or it may be integrated on a separate element, e.g. a controller component of the sensor C, as stipulated above.

Figure 2:
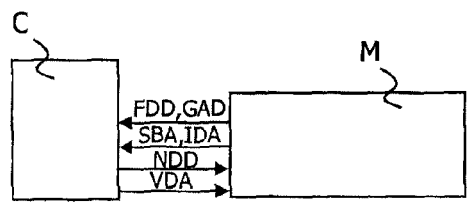
FIG. 2 is a diagram of the relationship between a control module as implemented in a device of the invention, and the image acquisition sensor.

As shown in FIG. 2, the sensor C of FIG. 1 including the unit AD is implemented together with a control module M, the two of them together forming an image acquisition device of the invention. In the context of acquisition device operation, the control module M and the sensor C exchange signals with each other. The nature of these signals is explained below with reference to FIG. 3.

Figure 3:
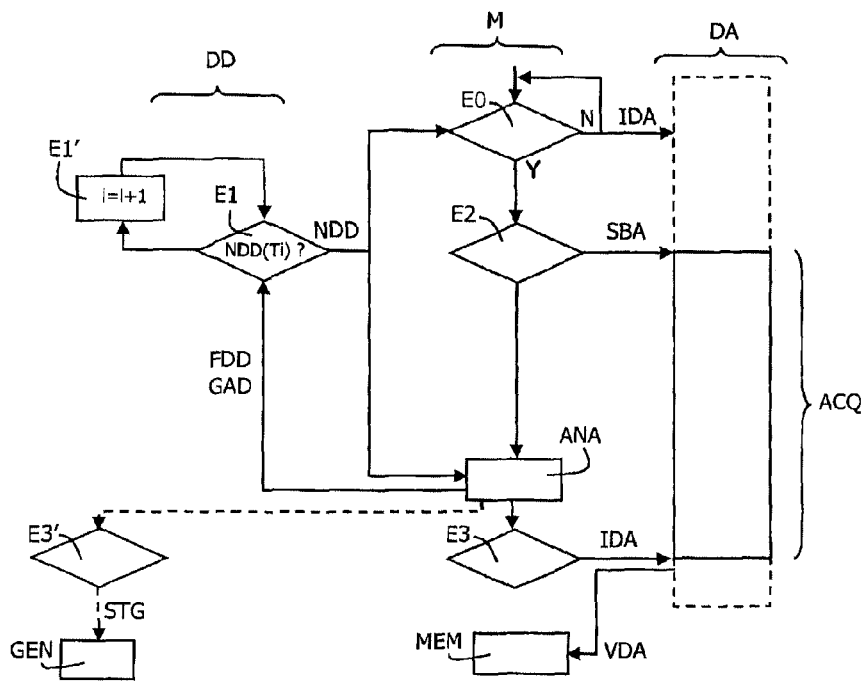
FIG. 3 is a flow chart of a method of the invention.

FIG. 3 is a flow chart of the method of the invention. This method, as implemented in the control module M of the image acquisition device of the invention, comprises periodic steps of sending a read command to the detection photodiode DD. The read commands for the detection photodiode DD are thus sent regularly and on a permanent basis.

To make FIG. 3 easier to read, it is subdivided into three portions, containing steps relating respectively to the operation of the detection photodiode DD, to the operation of the control module M, and to the operation of the acquisition diodes DA. In point of fact, all of the steps are controlled by the control module M, but they are performed either by the detection diode DD, or by the module M, or by the acquisition diodes DA, so it appears more convenient to separate these steps visually.

Thus, the periodic reading of the detection photodiode DD under the control of the module M is represented by a step E1, in which an output signal NDD is obtained at an instant Ti. The periodicity of this reading is represented diagrammatically in FIG. 3 by an incrementation step E'1 for incrementing the instant Ti to Ti+1.

When the matrix sensor C is in standby mode, the signal NDD is sent to the control module M for use in a step E0 having the purpose of detecting when irradiation occurs.

When no radiation is detected (case N: no saturation of the diode DD or no crossing of a detection threshold or no observation of a received energy rise rate or rise dynamics), the acquisition diodes DA are subjected to an inhibit command written IDA in FIG. 3. The acquisition diodes DA are then either periodically purged, or transfer of the received energy is inhibited, with photons not being transmitted.

When radiation is detected in step E0 (case Y: diode DD saturated or detection threshold exceeded or observation of a received energy rise rate or rise dynamics), a changeover step E2 is triggered. This step E2 has the effect of sending a changeover command SBA to the acquisition diodes DA to cause them to change over from standby mode to acquisition mode ACQ.

This changeover step E2 may also generate a command for the detection diode DD for the purpose of modifying its resolution. In particular, a command FDD for modifying the read frequency of the detection photodiode DD may then be sent. Advantageously, and even before the read frequency modification command FDD, a command is also generated at that moment for modifying the gain GAD with which the read signal SL from the detection photodiode DD is processed electronically.

Also, in order to determine whether a command for modifying the resolution of the detection photodiode DD is pertinent, it is useful for the value of the output signal NDD also to be sent on a permanent basis to an analysis unit ANA of the control module M, in which the quantity of energy received and the rate (or dynamics) of energy reception are analyzed within the control module M.

The unit ANA thus advantageously operates on a permanent basis. Nevertheless, it may also be activated during step E2 only. Depending on the rate (or dynamics) and the quantity of received energy, this unit ANA is suitable for deciding, and possibly for calculating, a modification in the frequency FDD with which the detection diode DD is read and/or a modification in the electronic processing gain GAD. This analysis unit ANA is also suitable for determining whether an optimum quantity of energy has been received or indeed, optionally, for determining an optimum duration for image acquisition as a function of the received energy and of the rate (or dynamics) at which said energy is received.

In the implementation shown in FIG. 3, the control module M is suitable, in a step E3, for sending an inhibit signal IDA to the acquisition diodes DA so as to stop acquisition by said diodes. This signal may be sent at the end of an optimum duration calculated by the unit ANA, at the end of a predetermined fixed duration, or indeed once an optimum of energy has been received by the sensor. The value read on the acquisition diodes, written VDA, is then sent to a memory MEM, as shown in FIG. 3.

According to an advantageous characteristic, the analysis step ANA may also lead to a step E3' that is performed simultaneously with the step E3 and that is drawn using dashed lines, this step causing the generator, here referenced GEN, that irradiates the sensor C to stop as soon as an optimum quantity of energy has been received. This step E3' causes a stop command STG to be sent to the generator GEN.

FIGS. 4 to 8 are timing diagrams of various pertinent magnitudes showing how several embodiments of a device of the invention operate.

Figure 4:
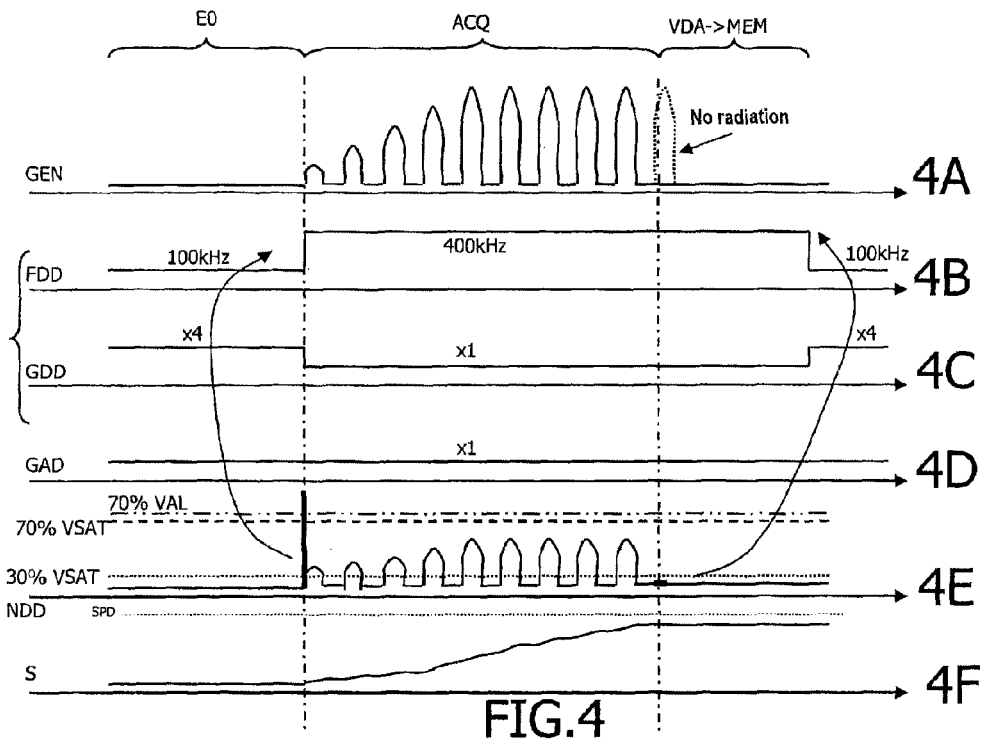
FIGS. 4A to 4F are timing diagrams of the simultaneous behaviors respectively: of an alternating current radiation generator; of a frequency with which the detection photodiode is read in a device of the invention suitable for modifying the resolution of the detection photodiode by increasing the frequency with which the detection photodiode is read and for detecting when the irradiation stops; of the gain of the photodiode; of the electronic gain used in a control module of the device; of the output signal from the detection photodiode; and of an accumulated reading of the output signal.

FIG. 4 applies to operation of the device of the invention when an AC radiation generator GEN is used. The energy emitted by the AC generator (referenced GEN in FIG. 4) is plotted as a function of time in FIG. 4A. By way of example, such an AC type generator emits X-rays once every 20 milliseconds (ms), i.e. at a frequency of 50 hertz (Hz). The width of the pulses is generally about 10 ms. FIG. 4 shows the operation of a device that is suitable for detecting the end of irradiation before a predetermined received energy threshold SPD is reached. This predetermined threshold SPD is a function of the size of the sensor and corresponds to an optimum quantity of energy received by the sensor for obtaining an image of good quality.

According to the invention, the detection photodiode DD is read periodically at a frequency that is much higher than the frequency of the pulses of radiation, with the frequency FDD in this example being 100 kilohertz (kHz), as shown in FIG. 4B. It can be seen that the clock frequency of 100 kHz corresponds to the detection photodiode being sampled at a sampling rate that produces a measurement once every 10 microseconds (µs). In the embodiment described and with constant exposure to X-rays, that corresponds to the detection photodiode GDD having a gain that is four times greater than at 400 kHz, as shown in FIG. 4C. The output signal NDD from the detection photodiode DD is shown in FIG. 4E. It can be seen that the value NDD is constant and not zero so long as the AC generator is not emitting. Step E0 is then looped back to itself, as shown in FIG. 3.

When the AC generator begins to emit, the output signal from the detection photodiode NDD increases strongly and quickly, as represented by a broad vertical line in FIG. 4E. Insofar as the X-ray emission lasts for about 10 ms, the frequency at which the detection photodiode is read enables 80 measurement samples to be obtained during a single emission period of the generator GEN. Such sampling enables an acceptable measurement to be obtained in application of the Nyquist-Shannon theorem.

The beginning of irradiation is thus detected on a small number of read samples of the detection photodiode DD and therefore cannot be shown in the timing diagrams of FIG. 4E other than diagrammatically by means of a broad line. It can be seen that X-ray emission is thus detected almost instantaneously in comparison with the operating rate (or dynamics) of the generator and the rate with which measurements are taken.

There are various ways of detecting the occurrence of radiation. It is possible to assume that radiation is detected from the moment when the output signal NDD for at least one measurement sample exceeds a threshold value for received energy intensity. Since the purpose is to trigger as quickly as possible, it is useful for the gain to be as large as possible and for the sampling frequency to be as low as possible while complying with sampling theorems. It should be observed here that the sampling frequency, even at its lowest value, always remains much greater than the radiation pulse frequency, and thus in any event enables radiation to be detected very quickly compared with the rate (or dynamics) at which the radiation is generated.

It is also possible to detect the occurrence of radiation only after tracking a small number of measurement samples of the signal NDD, where the rate (or dynamics) of the rise of the received energy was analyzed. The radiation is then detected by tracking the rate (or dynamics) at which energy is received.

This makes it possible to use the radiation rise signature of the generator to trigger changeover to acquisition mode. This avoids triggering acquisition mode when the sensor is irradiated with parasitic energy other than that coming from the scintillator and corresponding to the X-rays emitted by the generator.

As soon as X-ray emission by the generator is detected, as shown in FIG. 3, the step E2 generates a command signal SBA for the acquisition diodes, enabling the beginning of acquisition ACQ to be triggered. Simultaneously, when the analysis unit ANA that has also received the values of the output signal NDD from the detection photodiode becomes aware that the intensity of the received energy exceeds or is going to exceed the saturation threshold of the detection photodiode DD, e.g. from the generator rise signature, the unit ANA is arranged to send a command signal to the sensor C so as to increase the frequency FDD with which the detection diode DD is read, as can be seen in FIG. 4B where the frequency rises from 100 kHz to 400 kHz. The gain GDD of the photodiode DD is then divided by four, thus ensuring that no saturation of the detection photodiode DD is observed throughout the acquisition step. By way of example, the analysis unit ANA considers that the received energy is going to exceed the saturation threshold when it has received at least 70% of the energy that corresponds to the saturation threshold VSAT of the photodiode. This ensures that a quantitative value is obtained.

If the detection photodiode DD were to saturate during image acquisition, that would prevent the measurement of the received energy being quantitative and would thus make it impossible to determine the limit of exposure accurately.

This exposure limit is advantageously determined by a signal representing the sum of the instantaneous received energies S. This signal is shown in FIG. 4F and is incremented on each pulse sent by the generator GEN.

In FIG. 4, image acquisition is not stopped under the control of the signal S. The received signal is thus tracked but it is not used for optimizing the exposure of the acquired image. In this embodiment, it is detecting the end of emission by the generator GEN that triggers the end of image acquisition.

The detection photodiode DD is advantageously used for detecting the end of emission by the generator. When the signal NDD drops below a given value for a duration that is longer than the emission half-period of the generator, the analysis unit ANA is advantageously arranged to generate a command to stop acquisition by the acquisition diodes DA.

It should be observed that the electronic amplification gain GAD is not modified by the control module M. This means that the amplified read signals from the detection photodiode do not exceed 70% of the power supply voltage VAL of the amplifier unit AD.

Advantageously, after the radiation stops, the analysis unit ANA is arranged so that if there is a voltage that is less than 30% of the photodiode saturation voltage VSAT, then the read frequency FDD is reduced and the gain GAD is increased. This characteristic makes it possible to return to conditions that are favorable for the detection photodiode DD detecting new radiation.

Figure 5:
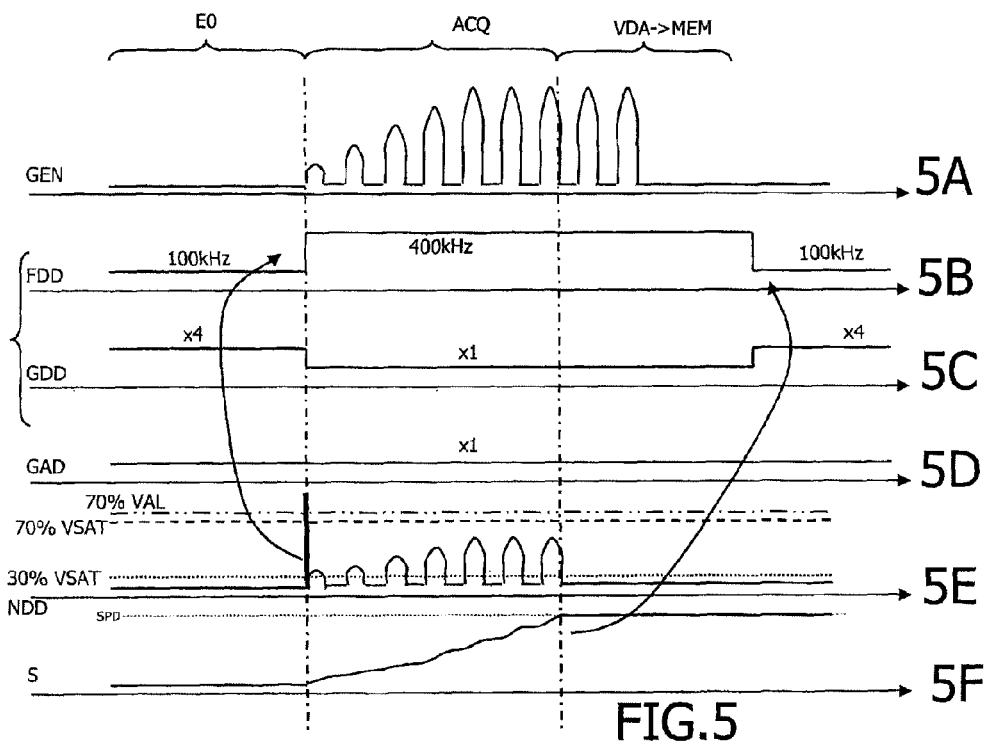
FIGS. 5A to 5F are timing diagrams of the simultaneous behaviors respectively: of an alternating current radiation generator; of a frequency with which the detection photodiode is read in a device of the invention suitable for modifying the resolution of the detection photodiode by increasing the frequency at which the detection photodiode is read, for detecting that a predetermined received energy threshold has been reached, and for inhibiting image acquisition on the matrix sensor; of the gain of the photodiode; of the electronic gain used in a control module of the device; of the output signal from the detection photodiode; and of an accumulated reading of the output signal.

FIG. 5 comprises timing diagrams similar to those of FIG. 4, for use of the same generator, with its emission of radiation GEN being once more plotted in FIG. 5A. FIG. 5 shows the operation of a device in which the resolution of the detection photodiode DD is likewise modified by increasing the frequency with which the detection photodiode DD is read on detecting radiation, as can be seen in FIGS. 5B and 5C.

The difference compared with FIG. 4 consists in image acquisition being inhibited as soon as the sum of the received energies S reaches an optimum threshold SPD of received energy that is predetermined to obtain an appropriate image that is optimum from the exposure point of view. After step E3 has been triggered, as shown in FIG. 3, the sensor C then receives a command signal IDA that inhibits the acquisition photodiodes DA. Image transfer then occupies about one second. It should be observed that the detection photodiode DD may also be inhibited. In FIG. 5A, it can be seen from the curve GEN that the generator then continues to emit two more pulses in spite of image acquisition having come to an end.

In an advantageous embodiment of the invention (not shown), the control module M controlling the sensor C is suitable for sending a command to the generator so as to cause it to stop emitting as soon as the predetermined optimum threshold SPD has been reached and image acquisition has been stopped.

Figure 6:
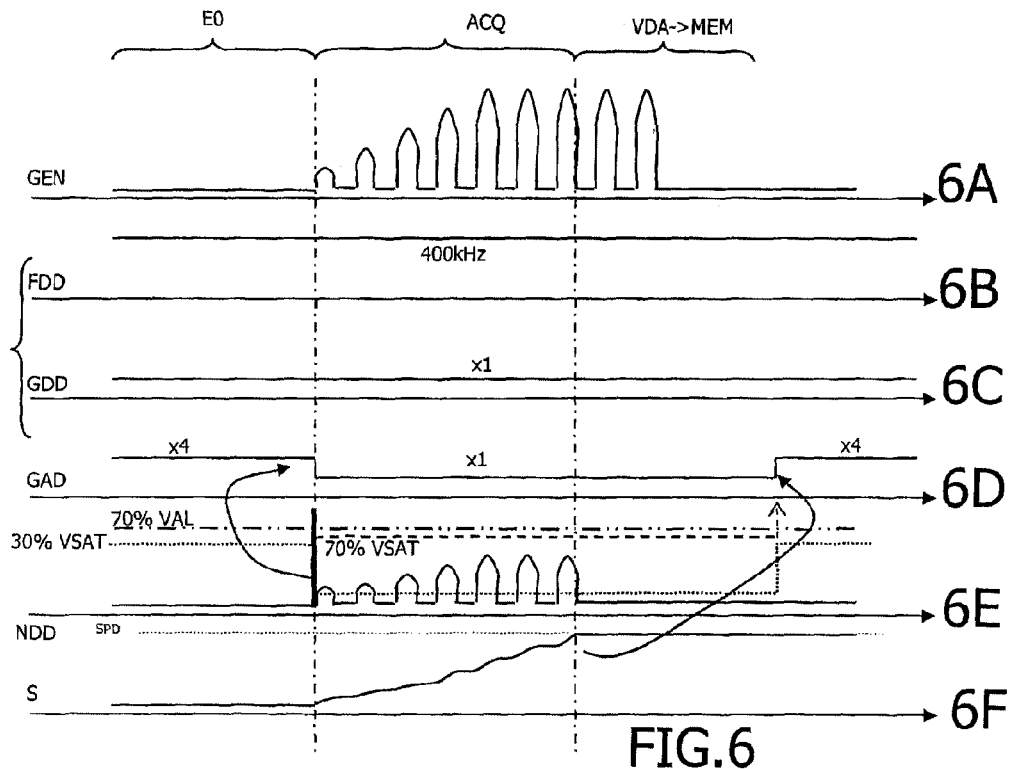
FIGS. 6A to 6F are timing diagrams of the simultaneous behaviors respectively: of an alternating current radiation generator; of a frequency with which the detection photodiode is read in a device of the invention suitable for modifying the resolution of the detection photodiode by modifying an electronic gain for processing the output signal from the detection photodiode, for detecting that a predetermined received energy threshold has been reached, and suitable for inhibiting image acquisition on the matrix sensor; of the gain of the photodiode; of the electronic gain used in a control module of the device; of the output signal from the detection photodiode; and an accumulated reading of the output signal.

FIG. 6 shows timing diagrams obtained using the same generator as in FIGS. 4 and 5, but in this embodiment there is a modification to the electronic gain GAD so as to ensure that there is no saturation in the amplification of the read signal by virtue of it exceeding the power supply voltage of the unit AD.

In this embodiment, in standby mode, the gain GAD is multiplied by four. This is useful for increasing detection sensitivity. This ×4 gain GAD also applies on the saturation voltage VSAT of the detection photodiode which therefore appears greater in the output signal NDD. It can thus be observed that 70% VSAT is not shown at the beginning and at the end of FIG. 6D since it lies off the scale shown. In contrast, the saturation level of the output signal relative to the power supply voltage VAL is not modified by applying the gain GAD. It should be observed that here it is the output signal NDD exceeding the value 70% VAL that is used for triggering a modification to the resolution of the photodiode or of the amplification, instead of exceeding the value 70% VSAT as shown in the preceding figures.

In FIG. 6D, on radiation being detected, the gain GAD is divided by four. This modification to the gain GAD enables energy levels as read on the detection photodiode DD to be sampled over a different interval. This modification makes it possible to retain the quantitative nature of the output signal NDD for the energies read on the photodiode that are greater than when using a gain of four for which a small quantity of energy read on the photodiode DD can be identified very quickly, as is useful in standby mode.

In the absence of a modification to the gain GAD, the amplified voltage NDD would exceed the power supply voltage VAL which would lead to the output signal NDD losing its quantitative nature.

In order for it to be possible to make use solely of the modification to the electronic gain GAD, it is necessary that the photodiode does not saturate at the frequency used. That is why, in this figure, the frequency used is directly 400 kHz, since this frequency gives the smallest resolution to the diode, including during standby mode, and also greatest capacity for receiving energy without saturating.

If the frequency of the detection diode DD were 100 kHz, then the intensity received on the detection photodiode DD would cause it to saturate. The pulses observed in FIG. 6 would then be seen to be peak-limited regardless of the gain GAD used in the processing of the signal from the detection photodiode DD.

In practice, modifications to the amplification gain and to the read frequency are used in combination. The gain is advantageously reduced as soon as radiation is detected, and frequency is increased subsequently or simultaneously. When the control module M is arranged so that the read frequency is modified on each occasion as a function of the received energy, it is very useful for the gain to be diminished immediately by a very large amount, e.g. by going from 1000 to 1, so that saturation of the electronic amplification does not mask the quantitative signal as read on the photodiode.

It can happen that a large gain leads to a quantitative signal as read from the non-saturated photodiode ceasing to be quantitative after it has been amplified since it has reached the power supply voltage VAL. This is harmful specifically when the output signal NDD, i.e. the amplified read signal, is used to define the frequency FDD with which the detection photodiode DD is read. It would then be necessary to reduce the frequency FDD to a much greater extent in order to obtain a quantitative signal than would be necessary if the amplification gain GAD were automatically reduced from the beginning of irradiation. This is shown below in FIG. 8.

Figure 7:
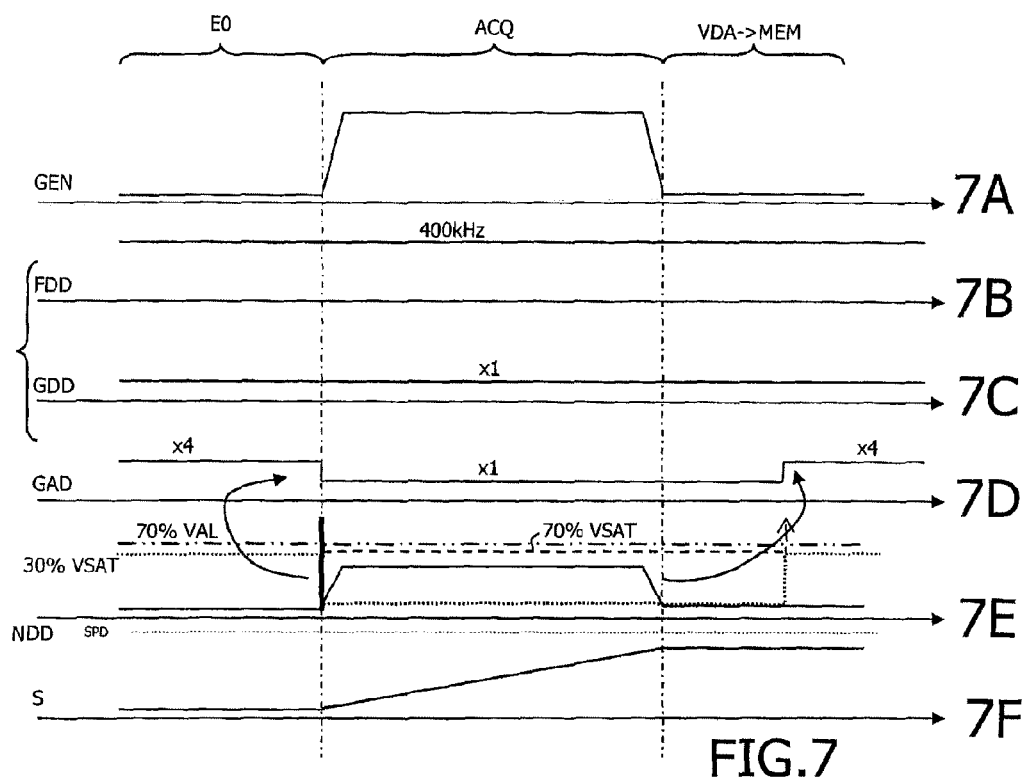
FIGS. 7A to 7F are timing diagrams of the simultaneous behaviors respectively: of a direct current radiation generator; of a frequency with which the detection photodiode is read in a device of the invention suitable for modifying the resolution of the detection photodiode by modifying an electronic gain for processing the output signal from the detection photodiode, for detecting that a predetermined received energy threshold has been reached, and suitable for inhibiting image acquisition on the matrix sensor; of the gain of the photodiode; of the electronic gain used in a control module of the device; of the output signal from the detection photodiode; and an accumulated reading of the output signal.

FIG. 7 shows timing diagrams of the simultaneous behaviors of pertinent magnitudes that are observed when a direct current (DC) radiation generator is used. The emission profile GEN from the DC generator is shown in FIG. 7A. Once more, it can be seen that the frequency FDD at which the photodiode is read is set at 400 kHz, and that in the embodiment that corresponds to FIG. 7, it is the electronic gain GAD that is modified to modify the resolution of the detection photodiode DD.

In FIG. 7, as soon as emission has been detected from the generator, the gain GAD changes over so as to reduce the resolution of the detection photodiode DD and so as to ensure that the output signal NDD is quantitative, as shown in FIG. 7E.

In this embodiment the sum signal S is linear, being of constant slope as shown in FIG. 7F. In FIG. 7, as in FIG. 4, stopping the generator causes acquisition ACQ by the acquisition diodes DA to be stopped. Stopping of the generator is detected by analyzing the signal NDD, as represented by FIG. 7E. Stopping of the DC generator is detected when the received energy drops below a predetermined floor.

Finally, it should be observed that the resolution of the detection photodiode DD may be modified not only at the time of changing the acquisition diodes DA over to acquisition mode, but also during acquisition ACQ by the acquisition diodes DA. This is useful when the intensity from the generator rises more than expected.

Figure 8:
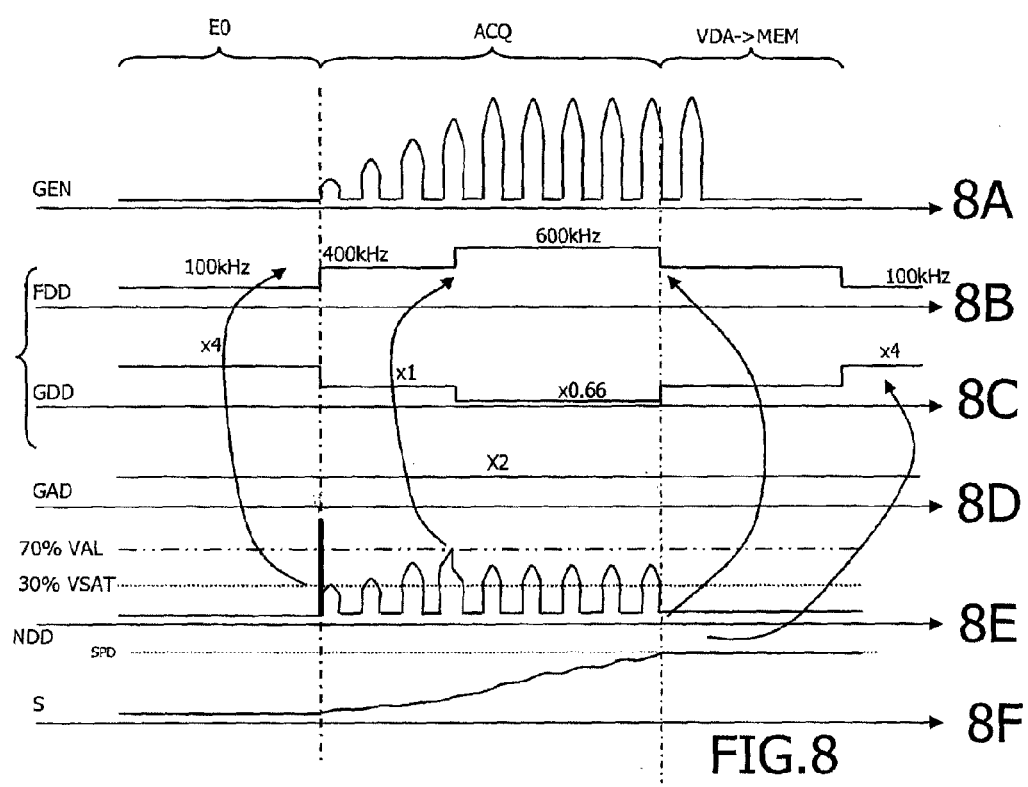
FIGS. 8A to 8F are timing diagrams of the simultaneous behaviors respectively: of an alternating current radiation generator; of a frequency with which the detection photodiode is read in a device of the invention suitable for modifying the resolution of the detection photodiode by increasing the frequency at which the detection photodiode is read at any moment during the irradiation, for detecting that a predetermined received energy threshold has been reached, and suitable for inhibiting image acquisition on the matrix sensor; of the gain of the photodiode; of the electronic gain used in a control module of the device; of the output signal from the detection photodiode; and an accumulated reading of the output signal.

This is shown in FIG. 8. In FIG. 8, it can be seen that the gain GAD is equal to two with a frequency of 100 kHz. It can then be seen that the value 30% VSAT is doubled compared with using unit gain GAD. Thus, for the emission GEN from the generator, as used in FIG. 4 for example, sensitivity for detecting radiation is correspondingly increased.

Once radiation has been detected, the frequency FDD is increased in accordance with the invention, in this embodiment being multiplied by four. Nevertheless, it should be observed that this no longer suffices starting from the fourth pulse from the generator since the signal NDD has reached a voltage corresponding to 70% of the power supply voltage VAL. Nevertheless, it can be observed that the diode DD does not saturate physically, so the read signal SL continues to be a representation of the received energy that is quantitative because of the increase in the read frequency.

The device is then suitable, as a result of the analysis unit ANA analyzing the instantaneous received energy, of further modifying the resolution of the detection photodiode DD by further increasing the frequency with which the detection photodiode DD is read, in this example by multiplying the frequency by 1.5 as soon as the signal NDD reaches 70% of VAL.

With this new increase in the read frequency FDD, the signal NDD does indeed remain below 70% of the power supply voltage VAL. The output signal NDD then remains in the range of energies read from the photodiode that can be amplified by the gain GAD without reaching the power supply voltage VAL. This makes it possible to ensure that the received energy continues to be quantitative, thereby making it possible to determine the instant at which the received energy corresponds to obtaining an image of appropriate quality.

Finally, it should be observed that various implementations can be achieved on the principles of the invention.

The invention claimed is:

1. An image acquisition device enabling a dental radiological image to be obtained, the device comprising:
   a matrix sensor integrating:
   a plurality of image acquisition photodiodes integrated in the form of a matrix, said image acquisition photodiodes being sensitive to radiation, and at least one detection photodiode integrated at the periphery of the matrix of acquisition photodiodes, said at least one detection photodiode being likewise sensitive to radiation, the at least one detection photodiode supplying an analog data read signal representative of energy received on the detection photodiode;
   an analog to digital processing unit configured to receive the analog data read signal and to supply a digital periodic output signal comprising pulses representative of instantaneous received energy;
   a control module configured to control the sensor and to read the detection photodiode periodically so as to obtain the periodic output signal during irradiation and image acquisition by the acquisition photodiodes, the periodic output signal being used to analyze the energy received during acquisition and to cause the sensor to change over between at least two modes:
   a standby mode in which the acquisition photodiodes are inhibited; and an acquisition mode in which the energy received by the acquisition photodiodes is used for acquiring an image;
   wherein the changeover between the two sets of modes is triggered as soon as the instantaneous received energy indicates that the detection photodiode has detected radiation from a generator, and wherein the control module is also configured to modify the resolution of the detection photodiode as a function of the periodic output signal from the detection photodiode in order to ensure that the detection photodiode does not saturate during irradiation.

2. The device according to claim 1, wherein the control module is configured to modify resolution by one or more of the following: increasing the frequency at which the detection photodiode is read after radiation has been detected, modifying the gain of the detection photodiode, or modifying the gain with which the read signal from the detection photodiode is processed by the processing unit.

3. The device according to claim 1, characterized in that the control module is configured to send a command to stop the acquisition mode as soon as a drop is observed in the periodic output signal.

4. The device according to claim 1, wherein the periodic output signal is summed during the image acquisition phase, and compared with an optimum quantity of energy to be received by the sensor.

5. The device according to claim 4, wherein the control module comprises an analysis unit configured to detect that the summed energy signal has exceeded an exposure limit and to send a command to an irradiation generator to cause it to stop irradiating.

6. The device according to claim 4, wherein the control module comprises an analysis unit configured to detect that the summed enemy signal has exceeded the optimum energy threshold and to send a command to the acquisition photodiodes to stop the acquisition mode.

7. The device according to claim 1, wherein the periodic output signal is used to detect malfunctions of the generator.

8. The device according to claim 1, wherein the size of the at least one detection photodiode is much greater than the size of the acquisition photodiodes, ensuring that the at least one detection photodiode saturates more quickly and therefore has sensitivity that is appropriate for detecting the radiation.

9. The device according to claim 1, wherein the detection photodiode is a single photodiode extending around the periphery of the matrix of acquisition photodiodes.

10. The device according to claim 1, wherein the control module comprises an analysis unit configured to monitor the periodic output signal such that when a voltage less than a first predetermined photodiode saturation voltage occurs after irradiation has stopped, then the control module reduces the read frequency of the detection photodiodes and increases the gain of the processing unit.

11. The device according to claim 1, wherein the control module comprises an analysis unit configured to detect that the periodic output signal has dropped below a given value for a given duration and to send a command to stop the acquisition mode by the acquisition photodiodes.

12. The device according to claim 1, wherein the control module is configured to modify the resolution of the detection photodiode when the periodic output signal exceeds a predetermined percentage of a photodiode saturation voltage.

13. The device according to claim 1, wherein the control module is configured to modify the resolution of the detection photodiode when the periodic output signal exceeds a predetermined percentage of the power supply voltage.

14. A method of controlling an image acquisition device according to any preceding claim, the method comprising periodic steps of:
   sending commands for reading the detection photodiode before and during irradiation and image acquisition by the acquisition photodiodes;
   providing, by detecting photodiodes, an analog data read signal representative of enemy received on the detection photodiode;
   supplying, by the analog to digital processing unit, a digital periodic output signal comprising pulses representative of the instantaneous received energy;
   receiving said output signal;
   commanding the sensor to change over between standby mode and acquisition mode, which step is triggered when the instantaneous received enemy indicates that the detection photodiode detects radiation from a generator;
   analyzing the energy received during acquisition by using the periodic output signal; and
   modifying, by the control module, the resolution of the detection photodiode as a function of the output signal from the detection photodiode so as to ensure there is no saturation of the detection photodiode during irradiation.

15. A non-transitory computer-readable recording medium having recorded thereon a computer program having the steps of the control method of claim 14.

* * * * *